United States Patent
Clarke

(10) Patent No.: US 9,530,304 B2
(45) Date of Patent: Dec. 27, 2016

(54) DISTRIBUTED SENSOR NETWORK

(71) Applicant: International Business Machines Corporation, Armonk, NY (US)

(72) Inventor: Michael P. Clarke, Ellenbrook (AU)

(73) Assignee: International Business Machines Corporation, Armonk, NY (US)

(*) Notice: Subject to any disclaimer, the term of this patent is extended or adjusted under 35 U.S.C. 154(b) by 40 days.

(21) Appl. No.: 14/528,267

(22) Filed: Oct. 30, 2014

(65) Prior Publication Data

US 2016/0125729 A1   May 5, 2016

(51) Int. Cl.
| | | |
|---|---|---|
| *G08B 17/12* | (2006.01) | |
| *G08B 27/00* | (2006.01) | |
| *G08B 17/00* | (2006.01) | |
| *G06Q 50/26* | (2012.01) | |
| *G06Q 90/00* | (2006.01) | |
| *H04W 4/02* | (2009.01) | |
| *H04W 4/22* | (2009.01) | |
| *H04W 68/00* | (2009.01) | |
| *H04W 76/00* | (2009.01) | |

(52) U.S. Cl.
CPC .......... *G08B 27/005* (2013.01); *G06Q 50/265* (2013.01); *G06Q 90/205* (2013.01); *G08B 17/00* (2013.01); *H04W 4/021* (2013.01); *H04W 4/22* (2013.01); *H04W 68/00* (2013.01); *H04W 76/007* (2013.01)

(58) Field of Classification Search
None
See application file for complete search history.

(56) References Cited

U.S. PATENT DOCUMENTS

2008/0157984 A1* 7/2008 Li .......................... G08B 17/10
340/584
2008/0309502 A1   12/2008 Boccia et al.
(Continued)

FOREIGN PATENT DOCUMENTS

CN          102521951 A       6/2012
CN          202472841 U       10/2012
(Continued)

OTHER PUBLICATIONS

Collins, Hilton, "Wi-Fi Network Could Help Detect Forest Fires", Emergency Management, Disaster Preparedness & Recovery (/disaster), May 10, 2012, © 2014 All rights reserved, e.Republic, <http://www.emergencymgmt.com/disaster/Wi-Fi-Network-Detect-Forest-Fires.html>.

(Continued)

*Primary Examiner* — Brian Zimmerman
*Assistant Examiner* — Thomas McCormack
(74) *Attorney, Agent, or Firm* — Bryan D. Wells; David M. Quinn

(57) ABSTRACT

Distributed sensing is provided. A first node of a plurality of nodes receives a fire status message from a second node of the plurality of nodes. The fire status message indicates a determination by the second node that an environmental condition exceeds a predetermined threshold. Each node of the plurality of nodes is a computing device. The first node estimates an arrival time of a fire based, at least in part, on the fire status message and a geographic location of the second node. The arrival time is a time until the fire arrives at a predetermined geographic location.

20 Claims, 6 Drawing Sheets

(56) References Cited

U.S. PATENT DOCUMENTS

2014/0167969 A1* 6/2014 Wedig .................. G08B 7/066
340/584
2015/0254972 A1* 9/2015 Patterson ............. G08B 29/185
340/545.1

FOREIGN PATENT DOCUMENTS

| CN | 202632461 U | 12/2012 |
|----|-------------|---------|
| CN | 203243421 U | 10/2013 |
| CN | 203415064 U | 1/2014  |

OTHER PUBLICATIONS

Kucuk et al., "FireSense: Forest Fire Prediction and Detection System using Wireless Sensor Networks", This work was supported by the Scientific and Technological Research Council of Turkey under Grant 105E158, pp. 1-3, <http://cse.yeditepe.edu.tr/~sbaydere/pub/DCOSS-2008-firesense.pdf>.
Solobera, Javier, "Detecting Forest Fires using Wireless Sensor Networks", Sep. 4, 2010, Libelium World, <http://www.libelium.com/wireless_sensor_networks_to_detec_forest_fires/>.
"Wireless sensor network", Wikipedia, the free encyclopedia, this page was last modified on Oct. 21, 2014, <http://en.wikipedia.org/wiki/Wireless_sensor_network>.
"Distributed Sensor Network", U.S. Appl. No. 14/817,729, pp. 1-41, filed Aug. 4, 2015.
Appendix P, List of IBM Patents or Patent Applications Treated as Related, pp. 1-2, filed on Aug. 5, 2015.

* cited by examiner

DISTRIBUTED SENSOR NETWORK

BACKGROUND OF THE INVENTION

The present invention relates generally to the field of network communications and, more particularly, to a distributed sensor network.

A smoke detector is a device that senses smoke, typically as an indicator of fire. Most smoke detectors work either by optical detection (photoelectric) or by physical process (ionization), while others use both detection methods to increase sensitivity to smoke. Commercial and residential security devices issue a signal to a fire alarm control panel as part of a fire alarm system, while household detectors, known as smoke alarms, generally issue a local audible or visual alarm from the detector itself.

A wildfire is a fire in an area of combustible vegetation that occurs in the countryside or a wilderness area. A wildfire is often uncontrolled. A wildfire differs from other fires by its extensive size, the speed at which it can spread out from its original source, its potential to change direction unexpectedly, and its ability to jump gaps such as roads, rivers and fire breaks. Wildfires are characterized in terms of the cause of ignition, their physical properties such as speed of progression, the combustible material present, and the effect of weather on the fire.

SUMMARY

According to one embodiment of the present disclosure, a method for distributed sensing is provided. The method includes a first node of a plurality of nodes receiving a fire status message from a second node of the plurality of nodes, wherein the fire status message indicates a determination by the second node that an environmental condition exceeds a predetermined threshold, and wherein each node of the plurality of nodes is a computing device; and estimating, by the first node, an arrival time of a fire based, at least in part, on the fire status message and a geographic location of the second node, wherein the arrival time is a time until the fire arrives at a predetermined geographic location.

According to another embodiment of the present disclosure, a computer program product for distributed sensing is provided. The computer program product comprises a computer readable storage medium and program instructions stored on the computer readable storage medium. The program instructions include program instructions to receive a fire status message at a first node of a plurality of nodes from a second node of the plurality of nodes, wherein the fire status message indicates a determination by the second node that an environmental condition exceeds a predetermined threshold; and program instructions to estimate an arrival time of a fire based, at least in part, on the fire status message and a geographic location of the second node, wherein the arrival time is a time until the fire arrives at a predetermined geographic location.

According to another embodiment of the present disclosure, a computer system for distributed sensing is provided. The computer system includes one or more computer processors, one or more computer readable storage media, and program instructions stored on the computer readable storage media for execution by at least one of the one or more processors. The program instructions include program instructions to receive a fire status message at a first node of a plurality of nodes from a second node of the plurality of nodes, wherein the fire status message indicates a determination by the second node that an environmental condition exceeds a predetermined threshold; and program instructions to estimate an arrival time of a fire based, at least in part, on the fire status message and a geographic location of the second node, wherein the arrival time is a time until the fire arrives at a predetermined geographic location.

DETAILED DESCRIPTION

Embodiments of the present invention recognize that tracking the progress of a fire is difficult but is important for public safety. Embodiments of the present invention provide for a distributed sensor network. Some embodiments provide a distributed sensor network for tracking the progress of a fire, such as a wildfire.

In one example, a distributed sensor network includes a plurality of nodes that each monitor environmental conditions. In response to detecting certain conditions (e.g., smoke or fire), a node transmits a fire status message to communications addresses of a notification list of the node, such as to one or more other nodes of the distributed sensor network. Based on the fire status message and locations of one or more other nodes, a node estimates a fire arrival time at a given location, which may be a geographical location where the node is located or another geographical location. The geographical location may be a plurality of geographical locations along an evacuation route. The node may issue a notification to one or more communications addresses of the notification list (e.g., a communications address of a device of a user) that identifies one or both of a fire arrival time and an evacuation route.

Figure 1:
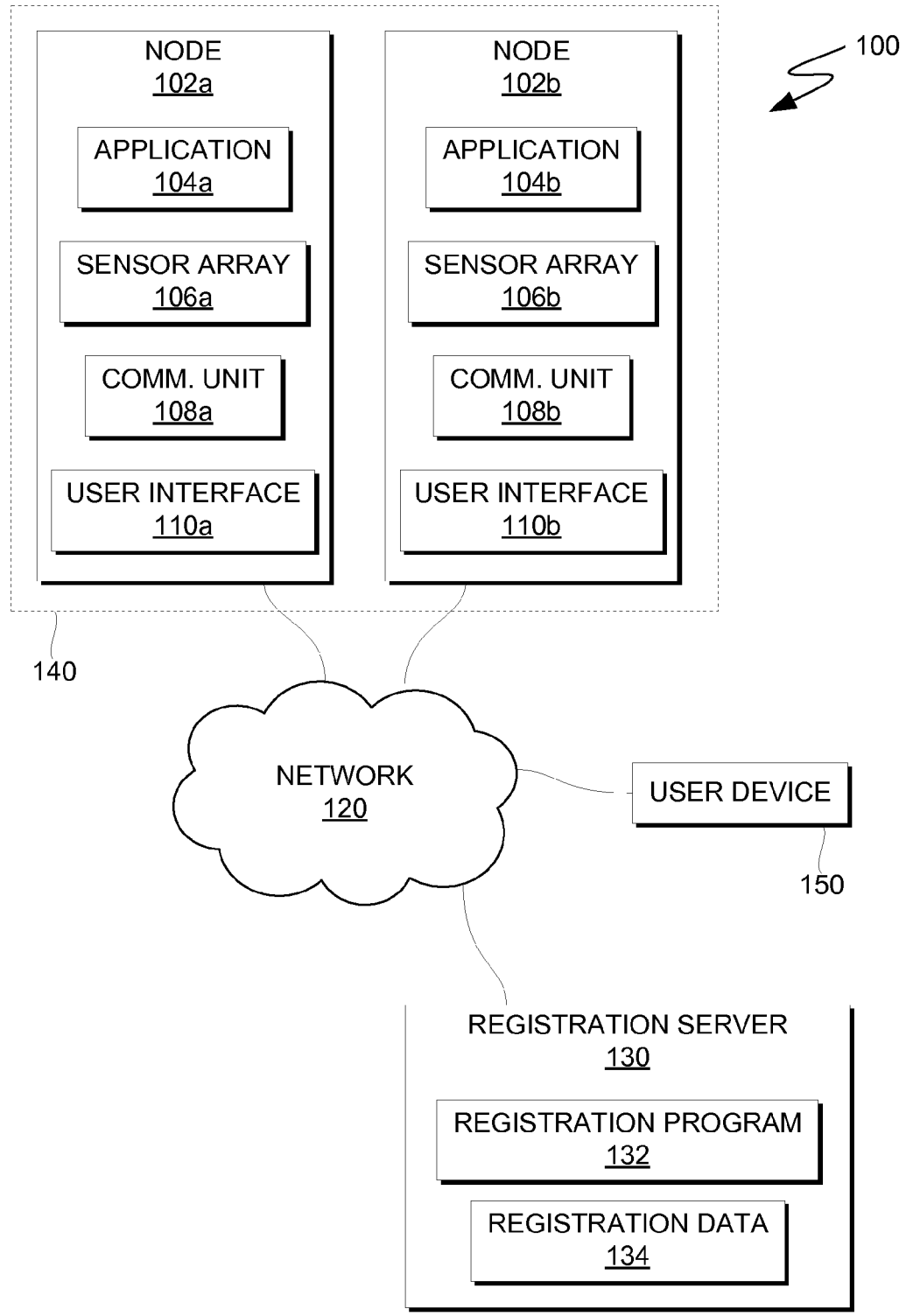
FIG. 1 is a functional block diagram illustrating a computing environment, in accordance with an embodiment of the present disclosure.

The present disclosure will now be described in detail with reference to the Figures. FIG. 1 is a functional block diagram illustrating a computing environment, in accordance with an embodiment of the present disclosure. For example, FIG. 1 is a functional block diagram illustrating computing environment 100. Computing environment 100 includes distributed sensor network 140 and registration server 130 connected over network 120. Distributed sensor network 140 includes node 102a and node 102b (collectively, node 102). In various embodiments, distributed sensor network 140 includes a fewer or greater number of nodes than depicted in FIG. 1. Each of node 102 includes an instance of application 104, sensor array 106, communications unit 108, and user interface 110. In one embodiment, distributed sensor network 140 is a network of nodes that is communicably interconnected with network 120. In another embodiment, distributed sensor network 140 is a plurality of nodes (e.g., node 102) that are in communication with one another and that are connected to network 120. In this case, each node 102 is connected to each other (and to registration server 130) over network 120. In one embodiment, distributed sensor network 140 is implemented with full or partial mesh network connectivity. For example, node 102a connects to node 102b, which replays messages between node 102a and server 130 via network 120.

In various embodiments, each node 102 is a computing device that can be a standalone device, a server, a laptop computer, a tablet computer, a netbook computer, a personal computer (PC), a personal digital assistant (PDA), a smartphone, a desktop computer, or any other programmable electronic device. In another embodiment, each node 102 represents a computing system utilizing clustered computers and components to act as a single pool of seamless resources. In general, each node 102 can be any computing device or a combination of devices with access to registration program 132 and sensor array 106 and capable of executing application 104. Each node 102 may include internal and external hardware components, as depicted and described in further detail with respect to FIG. 6.

In some embodiments, one or more node of node 102 is implemented in conjunction with a portable power supply (e.g., a battery or a solar panel), thereby facilitating deployment of the node in remote locations. In some embodiments, one or more node of node 102 is heterogeneous with respect to another of node 102. For example, one node 102 may be a smartphone that includes many capabilities in addition to those described herein, while another node 102 is a standalone device that is optimized to perform the capabilities described herein, while yet another node 102 is a PC.

In this exemplary embodiment, an instance of application 104 is stored on one or more nodes of node 102, and registration program 132 is stored on registration server 130. In other embodiments, one or both of application 104 and registration program 132 may reside on another computing device of computing environment 100, provided that each can access and is accessible by each other. In yet other embodiments, one or both of application 104 and registration program 132 may be stored externally and accessed through a communication network, such as network 120. Network 120 (or, e.g., distributed sensor network 140) can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between or among nodes of distributed sensor network 140 and between each node and registration server 130, in accordance with a desired embodiment of the present invention. In general, distributed sensor network 140 can be any combination of connections and protocols that will support communications between and among nodes of distributed sensor network 140, in accordance with a desired embodiment of the present invention. In one embodiment, network 120 is a cellular phone network. For example, one or more nodes of distributed sensor network 140 communicate with one another via network 120 using short message service (SMS) messages. In another embodiment, network 120 includes one or more pre-existing network infrastructures (e.g., a cellular phone network, 802.11 wireless infrastructure).

Application 104 operates to detect an alarm condition. In one embodiment, application 104 monitors data from sensor array 106, based on which application 104 determines whether an alarm condition exists. In one embodiment, distributed sensor network 140 includes a plurality of nodes, in which case each node 102 includes an instance of application 104, each of which has the capabilities described herein in connection with application 104. In one embodiment, application 104 communicates with registration program 132. In another embodiment, a first instance of application 104 (e.g., of node 102a) communicates with a second instance of application 104 (e.g., of node 102b). In one embodiment, an instance of application 104 (e.g., application 104a) receives a signal (e.g., from sensor array 106a, application 104b, or sensor array 106b). For example, the signal indicates one or both of the existence of or proximity (i.e., distance relative to the node generating the signal) of a fire (or an edge of a fire). In one embodiment, application 104 forwards a received signal (e.g., to another node). In one embodiment, application 104 forecasts an arrival time of a fire. In one embodiment, application 104 determines that an arrival time is below a threshold and application 104 issues a fire status message. In one embodiment, application 104 determines that a status signal time has expired and application 104 generates a node destruction notification.

In one embodiment, application 104 forecasts a fire arrival time relative to a geographical location associated with node 102. The geographical location may be the location of node 102, one or more locations other than the geographical location of node 102, or a combination thereof. The one or more locations may be collectively referred to herein as the location to monitor. In one embodiment, application 104 forecasts a fire arrival time for each location to monitor and, in response to determining that the fire arrival time for at least one location to monitor is below a threshold, application 104 issues fire status messages (see, e.g., FIGS. 2-6 and the accompanying descriptions) for the location to monitor. The location to monitor may include one or more geographical locations along an evacuation route.

In some embodiments, application 104 operates on a central server (e.g., registration server 130), in which case one or more nodes of distributed sensor network 140 may lack some or all of the capabilities described herein in connection with application 104, as those capabilities are instead performed by application 104 operating on the central server or on other nodes of distributed sensor network 140. For example, node 102 may be a computing device that excludes application 104 and forwards data from sensory array 106 to registration server 130, which executes an instance of application 104.

Registration program 132 operates to register node 102. In one embodiment, registration program 132 operates to maintain a network (e.g., distributed sensor network 140) of at least one node (e.g., node 102). Registration program 132 determines a geographical location of node 102. Registration program 132 registers node 102 with distributed sensor network 140. Registration program 132 identifies, for node 102, one or more other nodes adjacent to node 102. Registration program 132 determines a notification list for node 102. Registration program 132 monitors for alert signals.

Sensor array 106 is a device that provides data input. In one embodiment, sensor array 106 generates the data input by measuring environmental conditions. In various examples, sensor array 106 includes one or more of a smoke detector, thermometer, a light sensor or optical detector (e.g., a camera or any other photoreceptor operating in, for example, the infrared, visible, or other light spectrum), radar, lidar, a global positioning system (GPS) sensor, a proximity sensor, an audio sensor (i.e., a microphone), a gas (e.g., carbon monoxide) sensor, or a time-keeping device. In one embodiment, sensor array 106 detects and receives user input and, in response, provides data input. In one embodiment, sensor array 106 provides data input to internal storage of node 102 (see FIG. 4 and accompanying discussion). In various embodiments, sensor array 106 provides data input to one or more of application 104, communications unit 108, user interface 110, registration program 132, and registration data 134.

Communications unit 108 is a device through which application 104 communicates. In one embodiment, communications unit 108 communicably connects node 102 to network 120, distributed sensor network 140, another node of distributed sensor network 140, or any combination thereof. For example, communications unit 108 may be a network communications device (e.g., a network interface controller) that connects node 102 to network 120, via which application 104 communicates with registration program 132. In one embodiment, application 104 receives data from sensor array 106 and sends the data to registration server 130 via communications unit 108. In one embodiment, communications unit 108 is a cellular transceiver.

User interface 110 is an interface that provides information (e.g., to a user). In one embodiment, user interface 110 receives input from a user via user interactions with user interface 110. In one embodiment, user interface 110 provides alert information (e.g., a fire status message, a fire arrival time, or an evacuation recommendation). In one embodiment, one of more nodes of distributed sensor network 104 are implemented without user interface 110. For example, node 102 receives data representing user input from another computing device (e.g., via network 120). In another example, node 102 operates without user input. In another embodiment, user interface 110 is a device for producing a human-perceptible alarm signal (e.g., an audible, visual, or tactile alarm signal, or any combination thereof). For example, application 104 may issue a fire status message (see FIGS. 2-6 and accompanying discussion) by causing user interface 110 to produce an alarm sound and vibration.

Figure 6:
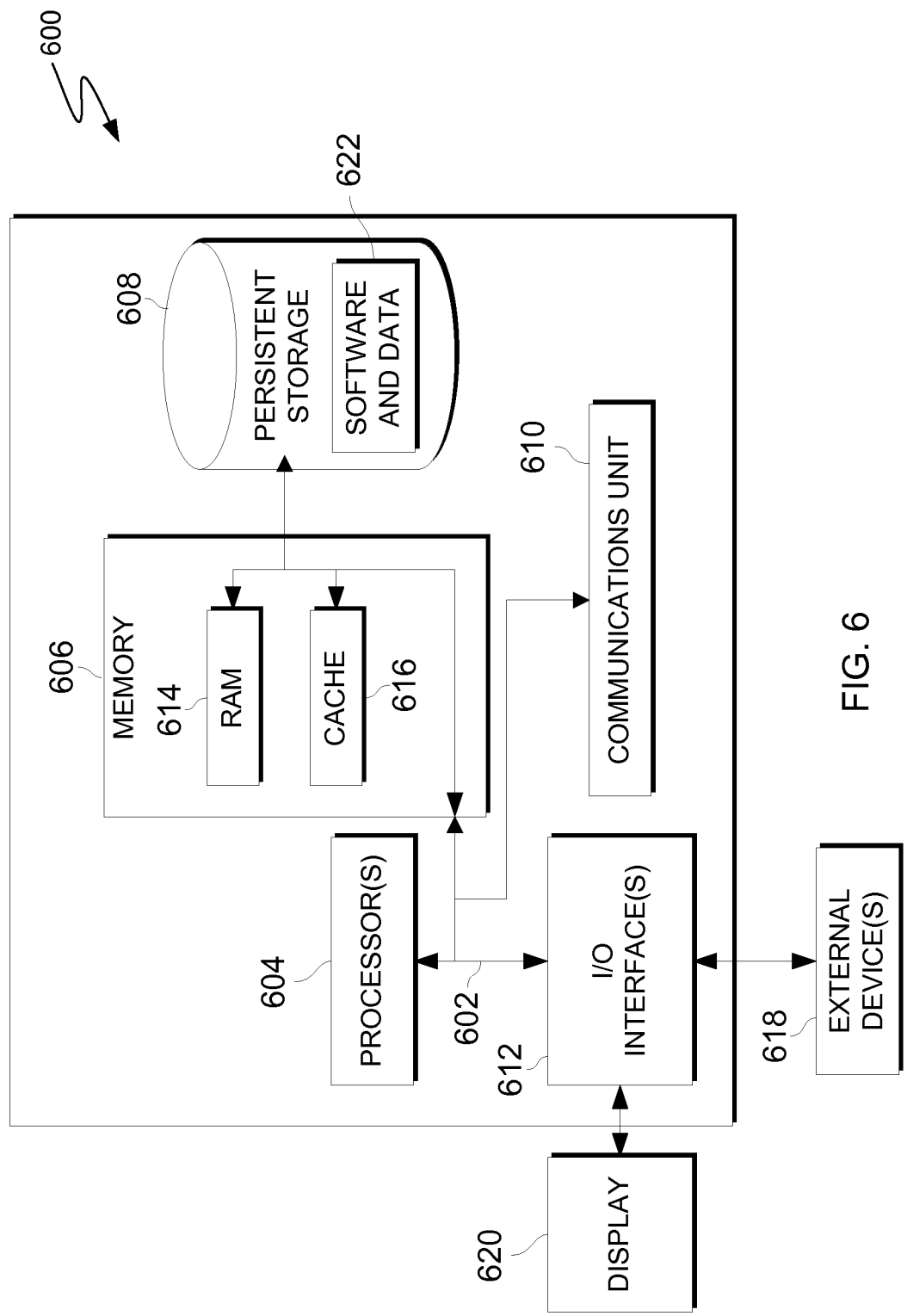
FIG. 6 is a block diagram of components of a computing device executing operations for distributed sensing, in accordance with an embodiment of the present disclosure.

User device 150 is a computing device of a user. In one embodiment, user device 150 is a node of distributed sensor network 140. For example, user device 150 may include an instance of application 104, sensor array 106 (e.g., a GPS sensor), communications unit 108 (e.g., a cellular transceiver), and user interface 110 (that presents information via, for example, display 620 as depicted in FIG. 6). In another embodiment, user device 150 is a device in communication with at least one node 102, registration server 130, or a combination thereof. For device 150 is a mobile communications device (e.g., a cellular phone) that is communicatively connected to distributed sensor network 140 via network 120. User device 150 has a communications address (e.g., a phone number) that may be included on the notification list of one or more nodes 102. In various embodiments, user device 150 may receive communications such as audio, SMS, or MMS from at least one node 102 and may present the received communication to a user of user device 150. In various embodiments, user device 150 is a computing device that can be a standalone device, a server, a laptop computer, a tablet computer, a netbook computer, a personal computer (PC), a personal digital assistant (PDA), a smartphone, a desktop computer, or any other programmable electronic device. In another embodiment, user device 150 represents a computing system utilizing clustered computers and components to act as a single pool of seamless resources. In general, user device 150 can be any computing device or a combination of devices with access to distributed sensor network 140. User device 150 may include internal and external hardware components, as depicted and described in further detail with respect to FIG. 6.

In various embodiments, registration server 130 is a computing device that can be a standalone device, a server, a laptop computer, a tablet computer, a netbook computer, a personal computer (PC), a personal digital assistant (PDA), a smartphone, a desktop computer, or any other programmable electronic device. In another embodiment, registration server 130 represents a computing system utilizing clustered computers and components to act as a single pool of seamless resources. In general, registration server 130 can be any computing device or a combination of devices with access to registration data 134 and each node 102 and capable of executing registration program 132. Registration server 130 may include internal and external hardware components, as depicted and described in further detail with respect to FIG. 6.

Registration data 134 is a data repository that may be written to and read by one or both of registration program 132 and application 104. Node details may be stored to registration data 134. In one embodiment, node details include information pertaining to node 102. For example, node details of node 102 include an identifier and a geographical location of node 102. In one embodiment, the node details of node 102 include one or more other locations associated with node 102. For example, the other locations may be waypoints of an evacuation route or may be other points of interest. In some embodiments, registration data 134 may be written to and read by programs and entities outside of computing environment 100, for example to populate the repository with node details.

In some embodiments, registration data 134 stores one or more evacuation routes for each registered node. Each evacuation route includes one or more waypoints, which are geographical locations along a travel route from a starting point to a destination. In one embodiment, the starting point is a location of node 102. In another embodiment, the starting point is a geographical location other than the location of node 102. In one example, the starting point is the current location of a user. In another example, the starting point is a location associated with the user (e.g., a location of a home of the user). The destination is a geographical location such as, for example, a shelter, an evacuation zone, a roadway, or other location. In one embodiment, some or all of the starting point, destination, and each waypoint is user-configured, pre-determined, or algorithmically determined. For example, a user provides (e.g., via user device 150) a starting point and a destination, and the waypoints are algorithmically determined based, at least in part, on maps of roads and other paths of travel. In one such embodiment, application 104 determines a fire arrival time for each waypoint of each evacuation route of a node. In response to determining that the fire arrival time for a waypoint of a first evacuation route is below a threshold, application 104 determines that the first evacuation route is unsafe. In response to determining that no evacuation routes are safe, application 104 issues an alert to user device 150 that notifies the user to seek shelter. In one embodiment, application 104 issues an evacuation recommendation (e.g., to user device 150) that identifies one or more evacuation routes. For example, an evacuation recommendation identifies all evacuation routes that are safe. See FIG. 5 for additional details.

Figure 2:
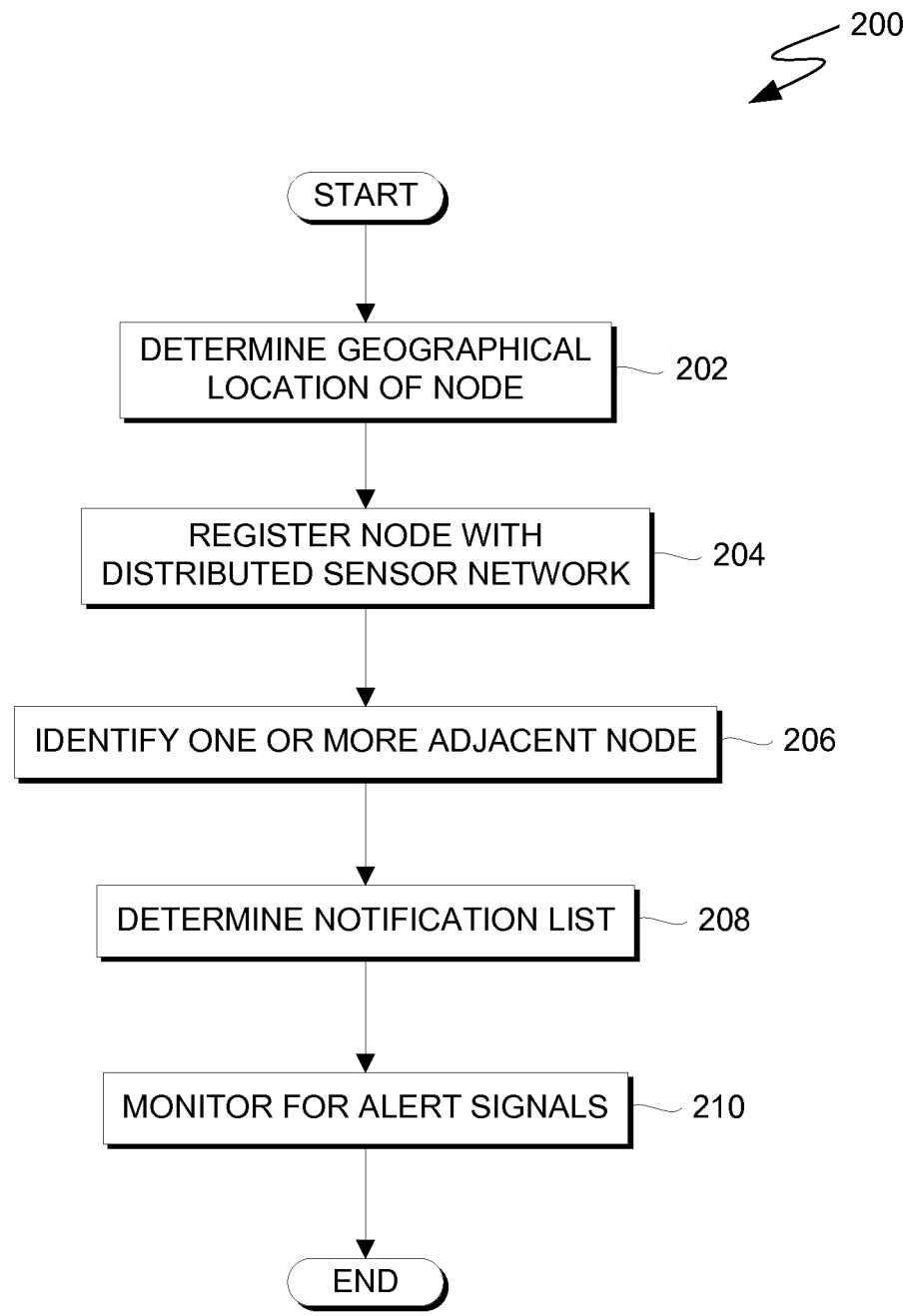
FIG. 2 is a flowchart depicting operations for distributed sensing, on a computing device within the computing environment of FIG. 1, in accordance with an embodiment of the present disclosure.

FIG. 2 is a flowchart depicting operations for distributed sensing, on a computing device within the computing environment of FIG. 1, in accordance with an embodiment of the present disclosure. For example, FIG. 2 is a flowchart depicting operations 200 of an instance of registration program 132 operating on registration server 130 within computing environment 100.

In operation 202, registration program 132 determines a geographical location to monitor. In one embodiment, registration program 132 receives the location to monitor from application 104. In one embodiment, the location to monitor is the location of node 102. In one example, application 104 receives data from sensor array 106 that indicates a geographical location (e.g., GPS coordinates) of the node 102. In another example, application 104 receives a location of node 102 as user input (e.g., via user interface 110). In yet another example, application 104 receives a location of node 102 from another node (e.g., from another instance of application 104 operating on another computer device). In another embodiment, registration program 132 determines the location of node 102. For example, registration program 132 triangulates the location of node 102 based on communications with other nodes (or, alternatively, with infrastructure of network 120). In another example, registration program 132 determines the location of node 102 utilizing geofencing to identify a geographical region that includes the location of node 102. In another example, network 120 includes communications devices with known locations and communications ranges (e.g., radio towers, wireless networking devices, or other nodes) and registration program 132 determines the location of node 102 based on which communications device(s) are in communication with node 102.

In one embodiment, the location to monitor is a location of interest to a user, which may be different from the location of node 102. For example, node 102b is a user device (e.g., a smartphone) and, based on input from a user, node 102b provides registration program 132 with a location of interest to the user, such as a street address of a house at which no nodes 102 are located. In response, registration program 132 determines the location to monitor based on the location provided by node 102b, which may be different from the geographical location of node 102b. In this example, the user uses node 102b to monitor a location remote other than the location of node 102b by node 102b communicating with other nodes of distributed sensor network 140. In various embodiments, there are zero or more nodes located at the location to monitor. In one example, the location to monitor is the location of a node. In another example, the location to monitor is a location within sensor range of one or more nodes, other than the location of a node.

In operation 204, registration program 132 registers a node with distributed sensor network 140. In one embodiment, registration program 132 registers node 102 with distributed sensor network 140 by storing node details of node 102 to registration data 134. For example, application 104 sends node details of node 102 to registration program 132, which stores the node details (e.g., location, communications address) to registration data 134, thereby registering node 102 with distributed sensor network 140.

In operation 206, registration program 132 identifies one or more adjacent nodes. The adjacent nodes for a node (e.g., node 102a) include one or more other nodes (e.g., node 102b) that are registered with distributed sensor network 140 and that are within a predetermined geographical proximity to the location to monitor. In one embodiment, registration program 132 identifies one or more adjacent nodes based on node details stored in registration data 134. For example, registration program 132 receives data from registration data 134 identifying one or more nodes that are registered with distributed sensor network 140, based upon which registration program 132 determines one or more nodes that are adjacent to a the location to monitor. In another embodiment, application 104 identifies the one or more adjacent nodes. For example, application 104 identifies one or more adjacent nodes based on geographical locations received from the one or more adjacent nodes. In one embodiment, one or both of registration program 132 or application 104 can discover nodes of distributed sensor network 140 using a network discovery protocol.

In another embodiment, application 104 of a first node (e.g., node 102) broadcasts a packet that requests geographical locations. In response to receiving such a packet, application 104 of a second node (e.g., node 102b) unicasts to the first node (e.g., node 102a) a packet identifying the geographical location of the second node (e.g., node 102b). In various embodiments, a node discovers other nodes of distributed sensor network 140 utilizing a central server (e.g., registration server 130); geofencing; SMS messaging, multicasting, or broadcasting; a wireless network; node-to-node radio communications; near-field communication, or any combination thereof. In one embodiment, node 102 communicates (e.g., via network 120) with one or more other nodes using registration server 130 as an intermediary. In another embodiment, node 102 communicates (e.g., via network 120) with one or more other nodes directly (i.e., without using registration server 130 as an intermediary). In one embodiment, distributed sensor network 140 is implemented without registration server 130. For example, distributed sensor network 140 is a decentralized peer-to-peer network.

In one embodiment, the one or more adjacent nodes include a predetermined number of nodes that are geographically nearest to the location to monitor. In another embodiment, the one or more adjacent nodes include those nodes that are within a predetermined geographical proximity to the location to monitor. In some embodiments, the geographical distance differs based on a geographical distribution of the nodes in various directions relative to the location to monitor. For example, the location to monitor is a location of a first node and the one or more nodes adjacent to a first node include those nodes within ten miles north of the first node and within five miles south of the first node. In another embodiment, the one or more adjacent nodes include all nodes within direct communication range in the area surrounding the location to monitor. For example, where nodes of distributed sensor network 140 communicate via radio transceivers, the one or more adjacent nodes include those nodes within range to transmit and receive radio transmissions to one another. In another embodiment, the one or more adjacent nodes include all nodes of the distributed sensor network 140. In another embodiment, the one or more adjacent nodes include an arbitrary selection of nodes.

In some embodiments, the one or more adjacent nodes include a number of nodes based, at least in part, on features of the geography surrounding the location to monitor. Such embodiments recognize that certain terrain or geographic features affect the speed at which fires spread. For example, a wildfire may spread faster across dry grasslands than across a river or highway. In one such embodiment, the one or more adjacent nodes include a count of nodes in each direction of the location to monitor, where each count is positively correlated with the speed at which fire spreads across the geographical features in that direction. For example, the one or more adjacent nodes include all nodes within ten miles north and within five miles south of the location to monitor, where fire spreads more slowly across the terrain to the south of the location to monitor. In some such embodiments, application 104 (or, in another embodiment, registration program 132) determines geographic features adjacent to the location to monitor based on mapping data including, for example, topography, vegetation, weather, climate, wind patterns, transportation routes (e.g., roadways, rail lines, and highways), and bodies of water (e.g., rivers and lakes). In some such embodiments, the mapping data includes current or prior fire-fighting efforts (e.g., deployments of fire retardant or fire breaks).

In some embodiments, the nodes in the one or more adjacent nodes changes over time. In various embodiments, nodes can come online, go offline, or relocate. In another embodiment, the criteria by which registration program 132 (or application 104) determines the one or more adjacent nodes can change. For example, registration program 132 (or application 104) may receive updated mapping data. In another example, registration program 132 (or application 104) determines the one or more adjacent nodes based upon a radius from the location to monitor and registration program 132 (or application 104) may receive user input (e.g., via user interface 110) changing the radius, in response to which registration program 132 (or application 104) re-determines the one or more adjacent nodes. In one such embodiment, registration program 132 updates the one or more adjacent nodes of the location to monitor in response to registering a new node that is adjacent to the location to monitor. For example, registration program 132 determines that a new node is adjacent to the location to monitor and, in response, registration program 132 (or, application 104) adds the new node to the one or more adjacent nodes for the location to monitor.

In some embodiments, node 102 stores a state for each of the one or more adjacent nodes of node 102. For example, a state of a node may be one of: safe, smoke, fire, or offline. In this case, a safe state indicates that the node is online and has not reported any abnormalities. A smoke state indicates that the node has detected smoke and may no longer be online. A fire state indicates that the device has reported fire conditions (e.g., temperature above a pre-determined threshold) and may no longer be online. In one such embodiment, a fire status message may identify a state of a node. In response to receiving a fire status message that identifies a state of a node, application 104 updates the status for the node with the state identified by the fire status message. In some embodiments, node 102 also stores a status for each evacuation route of node 102 based on a status of each waypoint of the evacuation route. In one such embodiment, the status for an evacuation route is the highest level of alert of any waypoint of the evacuation route, where fire is a higher level of alert than smoke, which is a higher level of alert than safe. In one embodiment, a fire status message includes a timestamp, which identifies a time. In various examples, the timestamp of a fire status message issued by a node identifies the time at which the node generated the fire status message, the time at which the node issues the fire status message, or the time at which the node detects fire conditions (e.g., the time at which the node determines than an ambient temperature exceeds a predetermined threshold).

In operation 208, registration program 132 (or application 104) determines a notification list. The notification list includes one or more communications addresses to which registration program 132 (or application 104) can issue notifications. In various embodiments, registration program 132 (or application 104) can issue a notification to an adjacent node via a network address (of network 120) of the adjacent node, to a phone number via an audible pre-recorded message, to a phone number via a message service such as SMS or multimedia message service (MMS), or to registration program 132 via network 120. In one embodiment, registration program 132 (or application 104) determines the notification list based, at least in part, on one or more of the following: a network address of each of the one or more adjacent nodes, user input (e.g., provided by a user via user interface 110) identifying one or more phone numbers, email addresses, or other communications addresses, and a network address of registration server 130 or other computing device executing registration program 132. In one embodiment, the notification list includes a communications address for emergency services (e.g., police, fire department, or forest service).

In some embodiments, the notification list includes one or more records, each of which identifies <address, type, format>, where address is a communications address, type is a type of the communications address, and format is a format of a communication to send to the communications address. In various examples, the type of a communications address may be a phone number, email address, or a network address. In one such embodiment, registration program 132 (or application 104) determines which medium by which to issue a notification to a communications address based on the type of the communications address. For example, a record may identify <123.123.123.123, network address, adjacent node>, which identifies 123.123.123.123 as a network address for an adjacent node. In this example, "adjacent node" identifies a format compatible with the adjacent node. In another example, a record may identify <123-456-7890, phone number, voice>, which identifies 123-456-7890 as a phone number that receives voice communications. In yet another example, a record may identify <098-765-4321, phone number, SMS>, which identifies 098-765-4321 as a phone number that receives SMS message communications.

In operation 210, registration program 132 monitors for alert signals. In one embodiment, alert signals include fire status messages or destruction alerts. For example, application 104 determines that an arrival time of a fire is below a threshold (see decision 306, discussed further below) and, in response, issues a fire status message (see operation 308, discussed further below). In this example, application 104 issues the fire status message by sending the fire status message to registration program 132. In response to receiving the fire status message from application 104, registration program 132 sends the fire status message notification to each communications address on the notification list in this example. In another example, application 104 sends the fire status message notification to each communications address on the notification list of node 102. In one embodiment, registration program 132 logs alerts signals received by registration server 130. In another embodiment, registration program 132 receives a destruction alert identifying a destroyed node of distributed sensor network 140. In response, registration program 132 de-registers the destroyed node by removing the registration information for the destroyed node from registration data 134. In yet another embodiment, registration program 132 (or, alternatively, application 104 of various nodes) updates the one or more adjacent nodes of any node that had included the destroyed node as an adjacent node to remove the destroyed node as an adjacent node.

Figure 3:
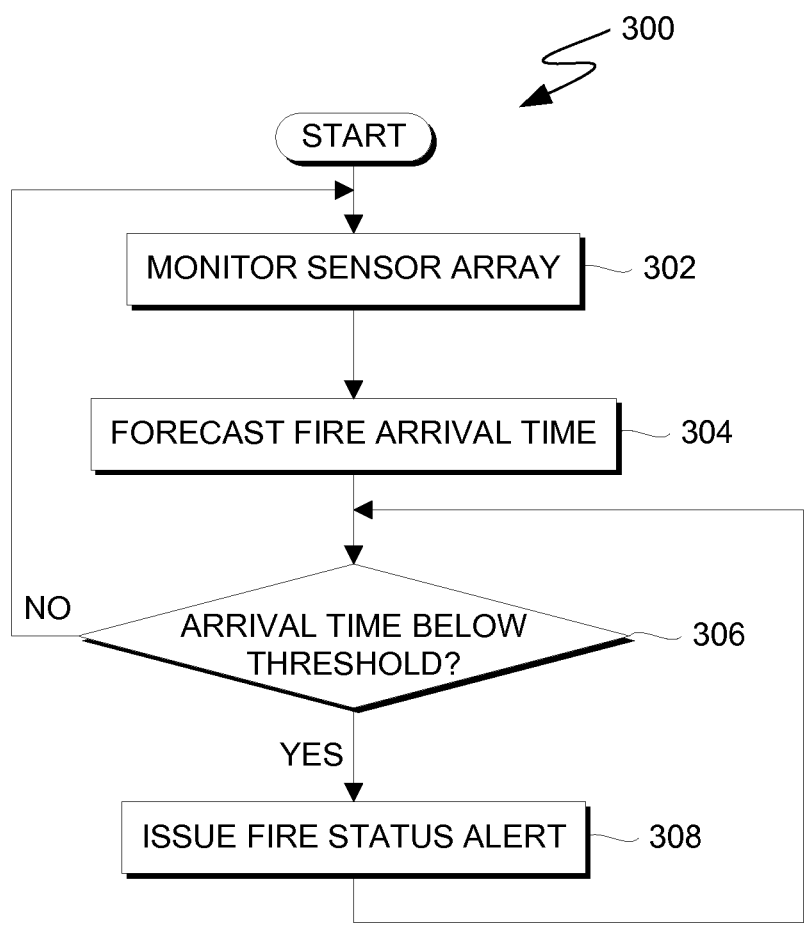
FIG. 3 is a flowchart depicting operations for distributed sensing, on a computing device within the computing environment of FIG. 1, in accordance with an embodiment of the present disclosure.

FIG. 3 is a flowchart depicting operations for distributed sensing, on a computing device within the computing environment of FIG. 1, in accordance with an embodiment of the present disclosure. For example, FIG. 3 is a flowchart depicting operations 300 of application 104 operating on node 102 within computing environment 100.

In operation 302, application 104 monitors sensor array 106. In one embodiment, application 104 monitors the input data as described above in connection with operation 210. Application 104 monitors sensor array 106 by receiving data from sensor array 106. In one embodiment, sensor array 106 detects environmental conditions in the proximity of node 102, such as temperature, wind speed, and the level of certain gasses (e.g., carbon dioxide, carbon monoxide). In one embodiment, application 104 receives and monitors data reflecting the conditions detected by sensor array 106.

In some embodiments, application 104 monitoring sensor array 106 includes node 102 operating in an adaptive sleep cycle. In one embodiment, during the adaptive sleep cycle, application 104 alternates between a normal state and a low-power state. In this embodiment, in the normal state, application 104 continuously monitors sensor array 106 by continually receiving data from sensor array 106. In the low-power state, node 102 monitors the sensor array 106 by receiving data from sensor array 106 periodically and reducing power to certain components (e.g., sensor array 106) at other times. In one such embodiment, the length of the period is based, at least in part, on an ambient temperature (i.e., the temperature in the immediate vicinity of node 102).

Thus, in this embodiment, application 104 monitoring sensor array 106 includes monitoring the data from sensor array 106 more frequently in response to the ambient temperature being higher than a pre-determined threshold value. For example, application 104 determines a frequency of twenty minutes if the ambient temperature is below 30° C., five minutes if ambient temperature is at least 30° C. but below 60° C., two minutes if temperature is at least 60° C. but below 80° C., and once second if the temperature is above 80° C. In another embodiment, application 104 deactivates the adaptive sleep cycle if the temperature reaches a pre-determined threshold value (e.g., 80° C.), in which case application 104 monitors sensor array 106 continuously.

In operation 304, application 104 forecasts a fire arrival time. A fire arrival time is an estimated time until a fire arrives at a location to monitor (e.g., the location of node 102). In one embodiment, application 104 forecasts a fire arrival time in response to detecting the presence of a fire. For example, application 104 forecasts a fire arrival time for the location to monitor in response to determining the presence of a fire based on data from sensor array 106. In another example, application 104 forecasts a fire arrival time in response to receiving a fire status message from an adjacent node. In another embodiment, application 104 forecasts a fire arrival time regardless of whether application 104 detects a fire. For example, if application 104 does not detect a fire, then application 104 forecasts a fire arrival time based on the distance between the location to monitor and the nearest edge of the graphical region monitored by distributed sensor network 140.

Alternatively, if application 104 does not detect a fire, then application 104 forecasts a fire arrival time by determining a fire risk based, at least in part, on data of sensor array 106. For example, application 104 determines a higher fire risk when the data from sensor array 106 indicates environmental conditions that are hot, dry, and windy than when the data indicates environmental conditions are cool, damp, and calm. In one embodiment, application 104 forecasts a fire arrival time based, at least in part, on pre-determined weighting factors for each type of data from sensor array 106 and pre-determined tables correlating such values with speeds at which a fire spreads. In another embodiment, application 104 forecasts a fire arrival time by detecting the position of an edge of a fire at two points in time and determining the speed at which the edge of fire is approaching the location to monitor as the distance traveled by the edge of the fire at each point in time divided by the time elapsed between the two points in time.

In some embodiments, application 104 provides some or all of the data from sensor array 106 to one or both of an adjacent node and registration server 130. In some embodiments, application 104 provides one or both of the fire arrival time and the determined fire risk to one or both of an adjacent node and registration server 130. In some embodiments, application 104 makes a determination based on data of sensor array 106 and includes data of sensor arrays of one or more other (e.g., adjacent) nodes. For example, a first node determines a fire risk based on data received from sensor array 106 of the first node and also from sensor array 106 from one or more one or more adjacent nodes. In another example, a first node forecasts a fire arrival time based on fire status messages received from a second node and a third node and further based on the geographical positions of the first node, second node and third node.

In some embodiments, application 104 determines a shape of an edge of a fire. In one such embodiment, application 104 sends information indicating the shape of the edge of the fire to registration server 130. In one embodiment, application 104 determines a degree to which node 102 is surrounded by the fire. In this embodiment, sensor array 106 has a field of view, which is the range of directions in which sensor array 106 detects data. Based upon the data from sensor array 106, application 104 determines in which directions the fire exists. For example, the field of view of sensor array 106 spans two hundred seventy degrees, from due south (i.e., 180°) through due west and due north to due east (i.e., 90°). Based upon the data across this field of view, application 104 determines that a fire exists from 280° to 330°. In one embodiment, application 104 also determines that sensor array 106 provides insufficient data to determine whether a fire exists in the ninety degree range from due east through south-east to due south. In another embodiment, application 104 determines a shape of an edge of a fire by determining a distance between node 102 and various points along the edge of the fire. For example, application 104 determines that a portion of the fire at 280° is half a mile away and that a portion of the fire at 315° is one mile away. In yet another embodiment, application 104 determines one or both of a shape of an edge of a fire or a degree to which node 102 is surrounded based on fire status messages from one or more adjacent nodes. For example, application 104 determines that a fire exists to the west of node 102 based on application 104 receiving a fire status message from an adjacent node to the west.

In some embodiments, application 104 determines a confidence score. The confidence score represents the strength of a determination. In one such embodiment, application 104 forecasting a fire arrival time includes application 104 determining a confidence score. In one such embodiment, application 104 determines a confidence score by sending a fire confirmation request to another node. For example, application 104 of a first node, based on input received from sensor array 106 of the first node, detects environmental conditions, such as an ambient temperature of 70° C. and other data (camera imagery, gas concentrations, etc.), that indicate the probable existence of a fire in an identified location. In this case, application 104 of the first node sends a fire confirmation request to a second node that is within sensory range (based on sensor array 106 of the second node) to the identified location. In this example, application 104 of the second node, based upon data received from sensory array 106 of the second node, detects environmental conditions consistent with a fire. In response, sends a positive confirmation signal to application 104 of the first node. Application 104 of the first node forecasts a fire arrival time based, at least in part, on the positive confirmation signal. The positive confirmation signal may also indicate, for example, some or all of the environmental conditions detected by the second node. In another such embodiment, application 104 (operating, in various examples, on a node of distributed sensor network 140 or on registration server 130) utilizes data from sensor array 106 of a plurality of nodes of distributed sensor network 140 to triangulate one or more of a position, shape, and speed of a fire. For example, application 104 determines the position of an edge of a fire by measuring the parallax of a point along the edge of the fire utilizing camera imagery from two nodes and the locations of the two nodes.

In some embodiments, node 102 monitors sensor array 106 (operation 302) by monitoring for fire status messages from one or more adjacent nodes. Node 102 receives one or more fire status messages. In response, forecasts a fire arrival time (operation 304). In various embodiments, node 102 forecasts the fire arrival time based on a time of the fire status message, a location of the adjacent node that issued the fire status message, or any combination thereof. The time of the fire status message is, in various examples, a time at which the adjacent node issues the fire status message or a time at which node 102 receives the fire status message. In another example, the fire status message identifies a location of the adjacent node. In yet another example, node 102 determines the location of the adjacent node based on data of registration data 132.

In decision 306, application 104 determines whether the fire arrival time is below a threshold. If application 104 determines that the fire arrival time is below the threshold, then application 104 issues a fire status message (operation 308). If application 104 determines that the fire arrival time is not below the threshold, then application 104 continues to monitor input data (operation 302). In various embodiments, the threshold is pre-determined, user-configured, or algorithmically-determined.

In operation 308, application 104 issues a fire status message. In one embodiment, application 104 issues a fire status message to some or all communications address identified by the notification list. In another embodiment, application 104 issues a fire status message to registration server 130 (e.g., to registration program 132), which issues the fire status message to some or all communications addresses identified by the notification list. In one embodiment, application 104 repeatedly or continuously issues a fire status message. For example, application 104 repeatedly issues the fire status message in response to repeatedly determining that the fire arrival time is below the pre-determined threshold (decision 306, YES branch). In another example, application 104 continuously issues the fire status message until application 104 determines that the fire arrival time is no longer below the pre-determined threshold (or, for example, until application 104 is rendered inoperable, such as due to destruction by fire).

In some embodiments, if application 104 determines that the fire arrival time is below the threshold, then application 104 sends a heartbeat signal to at least one adjacent node (or, alternatively, to registration server 130). In various embodiments, application 104 continuously or repeatedly sends a heartbeat signal (e.g., until application 104 determines that the fire arrival time is not below the threshold or until application 104 is incapable of sending the heartbeat signal, such as due to destruction of the node executing application 104). In some embodiments, if application 104 determines that the fire arrival time is no longer below the pre-determined threshold, then application 104 sends an all-clear heartbeat signal and ceases sending additional heartbeat signals. The adjacent node (or registration server 130) monitors the heartbeat signal (see FIG. 4 and accompanying discussion). In some embodiments, application 104 sends a heartbeat signal at regular intervals. In some embodiments, a heartbeat signal identifies a period of time within which application 104 will send the next heartbeat signal. In some embodiments, a first node sends a heartbeat signal to a second node, which, in response, sends a heartbeat signal to the first node, thereby creating a bilateral heartbeat link. In this case, the first node and second node monitors the heartbeat signal of each other. If either node determines that the other node is destroyed (see operation 408 and accompanying discussion), then the node creates a bilateral heartbeat link with a third node, which is another adjacent node.

Figure 4:
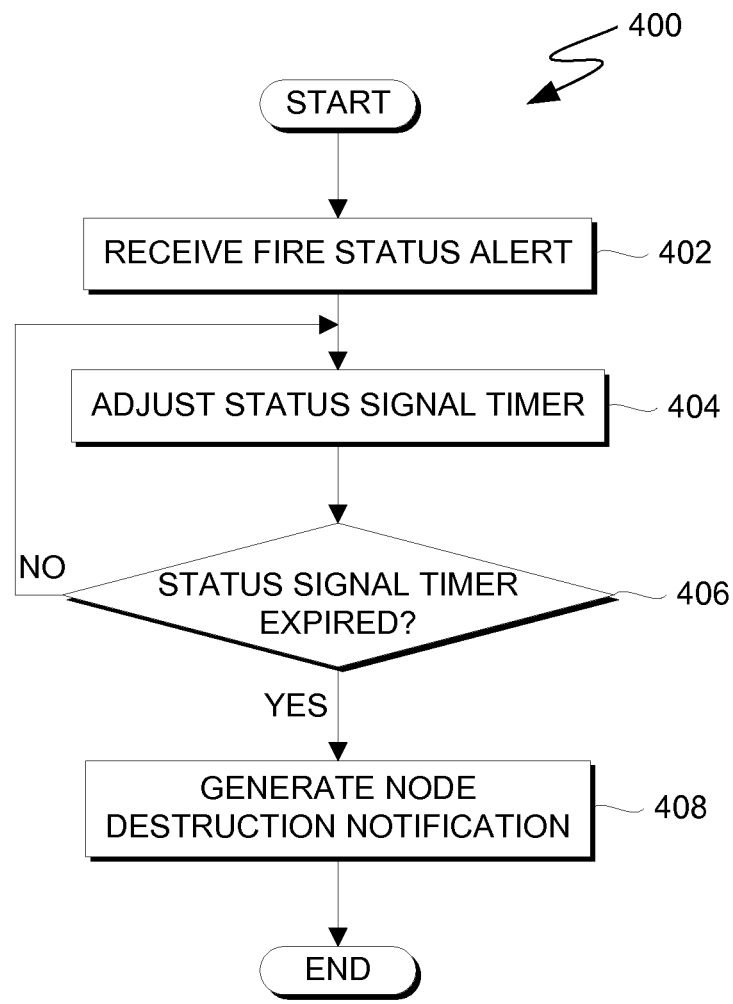
FIG. 4 is a flowchart depicting operations for distributed sensing, on a computing device within the computing environment of FIG. 1, in accordance with an embodiment of the present disclosure.

In some embodiments, the fire alert includes an evacuation recommendation. In various embodiments, an evacuation recommendation identifies some or all of an evacuation route, a safe time remaining for an evacuation route, and whether an evacuation route is safe. In another embodiment, application 104 determines that no evacuation routes of node 102 are safe. In response, application 104 generates an evacuation recommendation that recommends seeking shelter locally (e.g., a "stay and defend" recommendation). For further details regarding evacuation routes and evacuation recommendations, see FIG. 6 and the accompanying discussion FIG. 4 is a flowchart depicting operations for distributed sensing, on a computing device within the computing environment of FIG. 1, in accordance with an embodiment of the present disclosure. For example, FIG. 4 is a flowchart depicting operations 400 of application 104 operating on node 102 within computing environment 100.

In operation 402, application 104 receives a fire status message. In one embodiment, application 104 receives the fire status message from an adjacent node that issued a fire status message. For example, the adjacent node issued the fire status message in response to an instance of application 104 of the adjacent node determining that a forecasted fire arrival time is below a threshold (see FIG. 3 and accompanying discussion). In some embodiments, the fire status message includes a heartbeat signal, as discussed above. In some embodiments, the fire status message identifies a forecasted fire arrival time and/or some or all node details (e.g., an identifier or a location) of the node issuing the fire status message.

In operation 404, application 104 adjusts a status signal timer. In one embodiment, the status signal timer decrements a value representing time remaining. For example, the status signal timer counts down from five seconds as time elapses. The time expires based on the time remaining reaching zero. In one embodiment, application 104 receives a fire status message from an adjacent node. In response, application 104 adjusts a status signal timer by initiating a status signal timer for the adjacent node. In one embodiment, application 104 receives a heartbeat signal from the adjacent node and initializes a status signal timer with a value at least equal to the duration of time between heartbeat signals. For example, application 104 initializes a status signal timer for an adjacent node to ten seconds and the adjacent node sends a heartbeat signal every second. By initializing the timer to a value greater than the heartbeat interval, application 104 allows for missed or delayed (e.g., due to network latency) heartbeat signals, thereby increasing resilience against false positive node destruction notifications. In one embodiment, application 104 receives a heartbeat signal from an adjacent node with an associated status signal timer. In response, increases the time remaining for the status signal timer (e.g., by re-initializing the timer value to the initial value of the timer or by increasing the timer value by a pre-determined amount). For example, application 104 receives a heartbeat signal from an adjacent node that is associated with a status signal timer that has not yet expired and application 104 adjusts the status signal timer by setting the timer value to an initial value (ten seconds, in the previous example). In another embodiment, application 104 adjusts a status signal timer based on an amount of elapsed time. For example, application 104 decrements a time value of a status signal timer by an amount equal to the time that has elapsed since application 104 last adjusted the status signal timer. In some embodiments, application 104 ceases monitoring the status signal timer in response to receiving an all-clear heartbeat signal from a node with which the status signal timer is associated.

In decision 406, application 104 determines whether a status signal timer is expired. If application 104 determines that the status signal timer is expired (decision 406, YES branch), then application 104 generates a node destruction notification (operation 408). If application 104 determines that the status signal timer is not expired (decision 406, NO branch), then application 104 adjusts the status signal timer (operation 404). For example, adjusts the status signal timer (operation 404) by setting a time value of the status signal timer to an amount equal to the time elapsed since application 104 last received a heartbeat signal from the adjacent node associated with the status signal timer. In another embodiment, application 104 determines whether the status signal timer is expired (decision 406) periodically (e.g., once per second, once per five seconds). For example, application 104 determines whether the status signal is expired in time intervals greater than or equal to the expected time between each heartbeat signal.

In operation 408, application 104 generates a node destruction notification. In various embodiments, application 104 sends the node destruction notification to one or more nodes (e.g., an adjacent node), registration server 130, or a combination thereof. In one embodiment, the node destruction notification represents a determination by application 104 that an adjacent node has been rendered non-operational, in which case the node destruction notification identifies the adjacent node. In another embodiment, a first node receives a node destruction notification that identifies a second node. In response, the first node removes the second node (e.g., or a communications address thereof) from a notification list of the first node. In yet another embodiment, application 104 generates a node destruction notification for an adjacent node. In response, marks the adjacent node as destroyed. For example, application 104 updates the list of one or more adjacent nodes of node 102 by setting the status of the adjacent to destroyed. In yet another embodiment, application 104 determines a fire arrival time for the adjacent node that application 104 determined to be destroyed, wherein the fire arrival time is based, at least in part, on the time at which application 104 received the last heartbeat signal from the node and the time at which application 104 expected the next heartbeat signal from the node. For example, application 104 determines a fire arrival time for the adjacent node as the average of the time at which application 104 received last heartbeat signal from the node and the time at which application 104 expected the next heartbeat signal.

Figure 5:
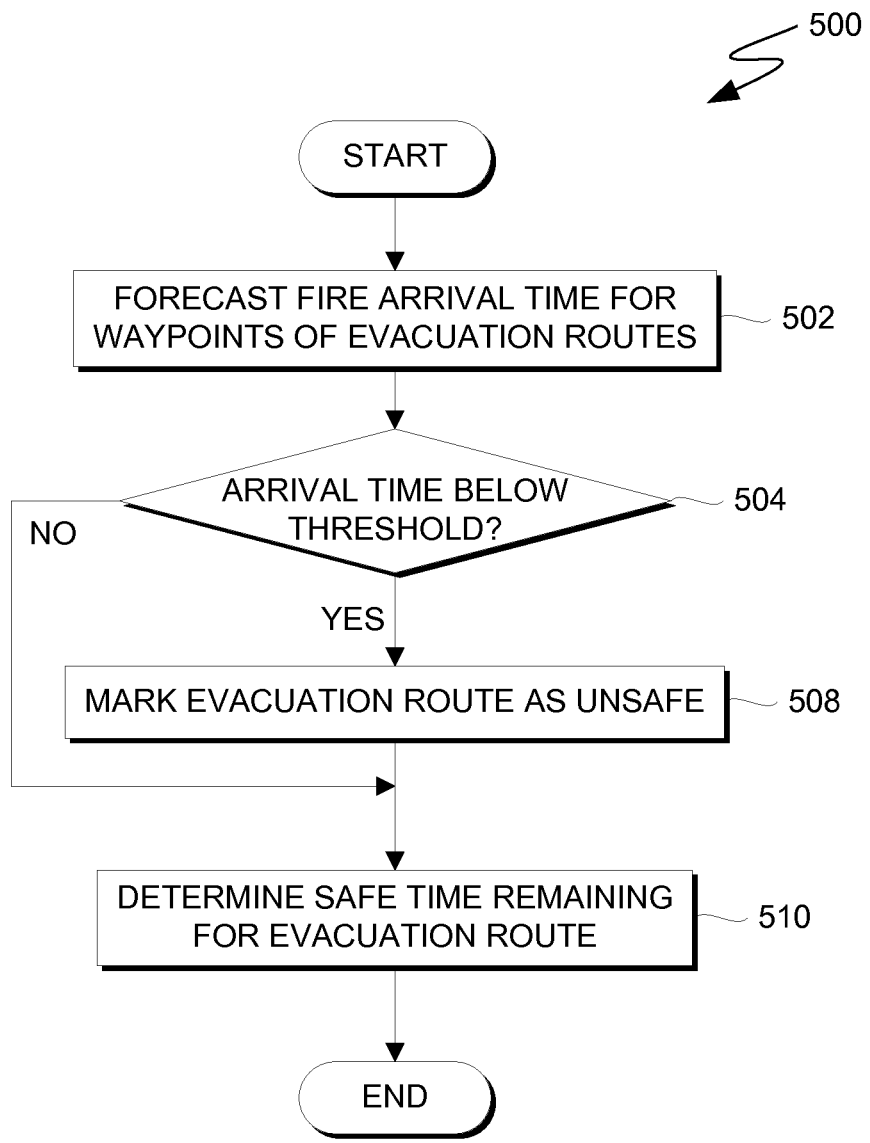
FIG. 5 is a flowchart depicting operations for distributed sensing, on a computing device within the computing environment of FIG. 1, in accordance with an embodiment of the present disclosure.

FIG. 5 is a flowchart depicting operations for distributed sensing, on a computing device within the computing environment of FIG. 1, in accordance with an embodiment of the present disclosure. For example, FIG. 5 is a flowchart depicting operations 500 of application 104 operating on node 102 within computing environment 100.

In operation 502, application 104 forecasts a fire arrival time for one or more waypoints of one or more evacuation routes. For example, application 104 forecasts a fire arrival time for each waypoint of each evacuation route associated with node 102. In one embodiment, application 104 forecasts a fire arrival time for a waypoint as described above in connection with application 104 forecasting a fire arrival time for a location to monitor.

In decision 504, application 104 determines whether the fire arrival time for a waypoint of an evacuation route is below a threshold. In various embodiments, the threshold is pre-determined, user-configured, or algorithmically-determined. If application 104 determines that the fire arrival time for the waypoint is below the threshold (decision 504, YES branch), then application 104 marks the evacuation route as unsafe (operation 508). If application 104 determines that the fire arrival time for the waypoint is not below the threshold (decision 504, NO branch), then application 104 determines the safe time remaining for the evacuation route.

In operation 510, application 104 determines the safe time remaining for the evacuation route. In one embodiment, application 104 determines the safe time remaining for each evacuation route associated with node 102. In another embodiment, application 104 determines the safe time remaining for each evacuation route that is not marked as unsafe. In one embodiment, application 104 determines the safe time remaining for an evacuation route based on a fire arrival time for each waypoint on the evacuation route, in which case the safe time remaining for an evacuation route is the least of the fire arrival times.

In some embodiments, application 104 ranks the evacuation routes for node 102. In one embodiment, application 104 ranks the evacuation routes based on the safe time remaining for each evacuation route. For example, application 104 determines which evacuation route is the safest, which is the evacuation route with the highest safe time remaining. In some embodiments, application 104 determines the safety of one or more evacuation routes of another node. For example, node 102a is located geographically proximate to node 102b. In this example, node 102a has no evacuation routes (or no safe evacuation routes). Application 104a receives one or more evacuation routes of node 102b and determines whether the evacuation routes node 102b are safe. In one such embodiment, application 104 determines whether an evacuation route of an adjacent node is safe in response to application 104 determining that node 102 has no safe evacuation route. In this embodiment, application 104 may also determine a route from the location to monitor to the location to monitor of the adjacent node.

For example, node 102 is located adjacent to a home of a user and is associated with a first evacuation route leading south from the home toward a first highway and a second evacuation route leading north from the home toward a second highway. Registration data 134 stores the first evacuation route, which includes a first waypoint and a second waypoint. Further, registration data 134 stores the second evacuation route, which includes a third waypoint. In this example, application 104 of the node (or, alternatively, of registration server 130) monitors sensor inputs from one or more nodes. Application 104 determines a fire arrival time for node 102 and for each waypoint of each of the first and second evacuation routes, based on which application 104 determines a safe time remaining for each evacuation route. In response to determining that an escape route is safe, application 104 generates a recommendation for a user to follow the escape route. Alternatively, in response to determining that no escape route is safe, application 104 generates a recommendation for a user to prepare shelter.

FIG. 6 is a block diagram of components of a computing device, generally designated 600, in accordance with an embodiment of the present disclosure. In various embodiments, computing device 600 is representative of node 102, registration server 130, or user device 150. For example, FIG. 6 is a block diagram of components of node 102 executing operations of application 104 within computing environment 100.

It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media. Software and data 622 is stored in persistent storage 608 for execution and/or access by one or more of the respective computer processors 604 via one or more memories of memory 606. With respect to node 102, software and data 622 represents application 104, data collected by application 104 from sensor array 106, and user interface 110. With respect to registration server 130, software and data 622 represents registration program 132 and registration data 134.

In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 120. In these examples, communications unit 610 includes one or more network interface cards. Communications unit 610 may provide communications through the use of either or both physical and wireless communications links. Software and data 622 may be downloaded to persistent storage 608 through communications unit 610.

I/O interface(s) 612 allows for input and output of data with other devices that may be connected to computing device 600. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention (e.g., software and data 622) can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for distributed sensing, the computer program product comprising:
   a computer readable storage medium and program instructions stored on the computer readable storage medium, the program instructions comprising:
   program instructions to identify, at the first node, one or more adjacent nodes of the plurality of nodes based, at least in part, on a predetermined geographical location and a geographical location of each of the one or more adjacent nodes, wherein (i) the one or more adjacent nodes of the plurality of nodes are within a predetermined geographical proximity to the predetermined geographical location, (ii) the one or more adjacent nodes include a second node of the plurality of nodes, and (iii) the first node has a capability to communicate with the one or more adjacent nodes, the program instructions to identify, at the first node, one or more adjacent nodes of the plurality of nodes comprising:
      program instructions to determine a count of adjacent nodes in a first direction from the predetermined geographical location based, at least in part, on one or more geographical features in the first direction; and program instructions to determine a count of adjacent nodes in a second direction from the predetermined geographical location based, at least in part, on one or more geographical features in the second direction;

program instructions to receive, at the first node, a fire status message from the second node, wherein the fire status message indicates a determination by the second node that an environmental condition exceeds a first predetermined threshold;

program instructions to estimate, at the first node, an arrival time of a fire based, at least in part, on the fire status message and a geographic location of the second node, wherein the arrival time is, at least in part, a function of a distance between an estimated position of the fire and a predetermined geographical location; and program instructions to issue, at the first node, a notification to a user device in response to determining, at the first node, that the arrival time is below a second predetermined threshold.

2. The computer program product of claim 1, wherein the predetermined geographic location is a first geographic location of a plurality of geographic locations that are associated with an evacuation route, and wherein the notification to the user device identifies the evacuation route.

3. The computer program product of claim 1, wherein the predetermined geographic location is a geographical location other than a geographical location where the first node is located.

4. The computer program product of claim 1, further comprising:
receiving, by the first node, a first heartbeat signal from the second node; and
setting, by the first node, a timer of time elapsed to an initial value.

5. The computer program product of claim 2, wherein the first geographical location is (i) a starting point of the evacuation route and (ii) a location of the user device.

6. A computer system for distributed sensing, the computer system comprising:
one or more computer processors;
one or more computer readable storage media;
program instructions stored on the computer readable storage media for execution by at least one of the one or more processors, the program instructions comprising:
program instructions to identify, at the first node, one or more adjacent nodes of the plurality of nodes based, at least in part, on a predetermined geographical location and a geographical location of each of the one or more adjacent nodes, wherein (i) the one or more adjacent nodes of the plurality of nodes are within a predetermined geographical proximity to the predetermined geographical location, (ii) the one or more adjacent nodes include a second node of the plurality of nodes, and (iii) the first node has a capability to communicate with the one or more adjacent nodes, the program instructions to identify, at the first node, one or more adjacent nodes of the plurality of nodes comprising:
program instructions to determine a count of adjacent nodes in a first direction from the predetermined geographical location based, at least in part, on one or more geographical features in the first direction; and program instructions to determine a count of adjacent nodes in a second direction from the predetermined geographical location based, at least in part, on one or more geographical features in the second direction;

program instructions to receive, at the first node, a fire status message from the second node, wherein the fire status message indicates a determination by the second node that an environmental condition exceeds a first predetermined threshold;

program instructions to estimate, at the first node, an arrival time of a fire based, at least in part, on the fire status message and a geographic location of the second node, wherein the arrival time is, at least in part, a function of a distance between an estimated position of the fire and a predetermined geographical location; and program instructions to issue, at the first node, a notification to a user device in response to determining, at the first node, that the arrival time is below a second predetermined threshold.

7. The computer system of claim 6, wherein the predetermined geographic location is a first geographic location of a plurality of geographic locations that are associated with an evacuation route, and wherein the notification to the user device identifies the evacuation route.

8. The computer system of claim 6, wherein the predetermined geographic location is a geographical location other than a geographical location where the first node is located.

9. The computer system of claim 6, the program instructions further comprising:
receiving, by the first node, a first heartbeat signal from the second node; and
setting, by the first node, a timer of time elapsed to an initial value.

10. The computer program product of claim 5, wherein a second geographical location of the plurality of geographical locations is a destination of the evacuation route, and wherein the program instructions further comprise:
program instructions to determine, at the first node, a plurality of waypoints between the starting point of the evacuation route and the destination of the evacuation route based, at least in part, on a map of roads, wherein each waypoint of the plurality of waypoints is a respective geographical location of the plurality of geographical locations;
program instructions to determine, at the first node, a waypoint fire arrival time for each waypoint of the plurality of waypoints based, at least in part, on the first status message and the geographical location of the second node, wherein the waypoint fire arrival time is, at least in part, a function of a distance between the estimated position of the fire and a respective waypoint; and
program instructions to issue, at the first node, a second notification to the user device in response to determining, at the first node, that a waypoint fire arrival time of any waypoint of the plurality of waypoints is less than a third predetermined threshold, wherein the second notification indicates that the evacuation route is unsafe.

11. The computer program product of claim 4, wherein the initial value is based, at least in part, on a value identified by the first heartbeat signal.

12. The computer program product of claim 4, the program instructions further comprising:

program instructions to receive a second heartbeat signal from the second node; and program instructions to re-initialize the value of the timer to the initial value.

13. The computer system of claim 7, wherein the first geographical location is (i) a starting point of the evacuation route and (ii) a location of the user device.

14. The computer system of claim 13, wherein a second geographical location of the plurality of geographical locations is a destination of the evacuation route, and wherein the program instructions further comprise:

program instructions to determine, at the first node, a plurality of waypoints between the starting point of the evacuation route and the destination of the evacuation route based, at least in part, on a map of roads, wherein each waypoint of the plurality of waypoints is a respective geographical location of the plurality of geographical locations;

program instructions to determine, at the first node, a waypoint fire arrival time for each waypoint of the plurality of waypoints based, at least in part, on the first status message and the geographical location of the second node, wherein the waypoint fire arrival time is, at least in part, a function of a distance between the estimated position of the fire and a respective waypoint; and program instructions to issue, at the first node, a second notification to the user device in response to determining, at the first node, that a waypoint fire arrival time of any waypoint of the plurality of waypoints is less than a third predetermined threshold, wherein the second notification indicates that the evacuation route is unsafe.

15. The computer system of claim 9, wherein the initial value is based, at least in part, on a value identified by the first heartbeat signal.

16. The computer system of claim 9, the program instructions further comprising:

program instructions to receive a second heartbeat signal from the second node; and program instructions to re-initialize the value of the timer to the initial value.

17. A computer system for distributed sensing, the computer system comprising:

one or more computer processors;

one or more computer readable storage media;

program instructions stored on the computer readable storage media for execution by at least one of the one or more processors, the program instructions comprising:

program instructions to identify, at the first node, one or more adjacent nodes of the plurality of nodes based, at least in part, on a predetermined geographical location and a geographical location of each of the one or more adjacent nodes, wherein (i) the one or more adjacent nodes include a second node of the plurality of nodes, (ii) the first node has a capability to communicate with the one or more adjacent nodes, (iii) the predetermined geographic location is a first geographic location of a plurality of geographic locations that are associated with an evacuation route, and (iv) a second geographical location of the plurality of geographical locations is a destination of the evacuation route;

program instructions to receive, at the first node, a fire status message from the second node, wherein the fire status message indicates a determination by the second node that an environmental condition exceeds a first predetermined threshold;

program instructions to estimate, at the first node, an arrival time of a fire based, at least in part, on the fire status message and a geographic location of the second node, wherein the arrival time is, at least in part, a function of a distance between an estimated position of the fire and a predetermined geographical location;

program instructions to issue, at the first node, a notification to a user device in response to determining, at the first node, that the arrival time is below a second predetermined threshold, wherein the notification to the user device identifies the evacuation route and wherein the first geographic location is (i) a starting point of the evacuation route and (ii) a location of the user device;

program instructions to determine, at the first node, a plurality of waypoints between the starting point of the evacuation route and the destination of the evacuation route based, at least in part, on a map of roads, wherein each waypoint of the plurality of waypoints is a respective geographical location of the plurality of geographical locations;

program instructions to determine, at the first node, a waypoint fire arrival time for each waypoint of the plurality of waypoints based, at least in part, on the first status message and the geographical location of the second node, wherein the waypoint fire arrival time is, at least in part, a function of a distance between the estimated position of the fire and a respective waypoint; and program instructions to issue, at the first node, a second notification to the user device in response to determining, at the first node, that a waypoint fire arrival time of any waypoint of the plurality of waypoints is less than a third predetermined threshold, wherein the second notification indicates that the evacuation route is unsafe.

18. The computer system of claim 17, the program instructions further comprising:

receiving, by the first node, a first heartbeat signal from the second node; and setting, by the first node, a timer of time elapsed to an initial value.

19. The computer system of claim 18, wherein the initial value is based, at least in part, on a value identified by the first heartbeat signal.

20. The computer system of claim 19, the program instructions further comprising:

program instructions to receive a second heartbeat signal from the second node; and program instructions to re-initialize the value of the timer to the initial value.

* * * * *